United States Patent
Richards

(10) Patent No.: US 8,126,994 B2
(45) Date of Patent: Feb. 28, 2012

(54) SIMULATION TECHNIQUES IN A DISTRIBUTED COMPUTER SYSTEM

(75) Inventor: Andrew Richards, Edinburgh (GB)

(73) Assignee: ITI Scotland Limited (GB)

( * ) Notice: Subject to any disclaimer, the term of this patent is extended or adjusted under 35 U.S.C. 154(b) by 0 days.

(21) Appl. No.: 11/946,628

(22) Filed: Nov. 28, 2007

(65) Prior Publication Data

US 2008/0133652 A1 Jun. 5, 2008

(30) Foreign Application Priority Data

Dec. 5, 2006 (GB) .................................. 0624297.8

(51) Int. Cl.
- *G06F 15/173* (2006.01)
- *G06F 3/048* (2006.01)
- *A63F 9/24* (2006.01)
- *G09G 2/02* (2006.01)

(52) U.S. Cl. ........... 709/223; 463/42; 715/757; 345/633

(58) Field of Classification Search .................. 709/203, 709/223

See application file for complete search history.

(56) References Cited

U.S. PATENT DOCUMENTS

| | | | | |
|---|---|---|---|---|
| 6,628,287 | B1* | 9/2003 | Duda et al. ..................... | 345/475 |
| 2007/0066403 | A1* | 3/2007 | Conkwright ..................... | 463/43 |
| 2007/0094325 | A1* | 4/2007 | Ih et al. ......................... | 709/203 |
| 2008/0030503 | A1* | 2/2008 | Yeh ............................... | 345/473 |

FOREIGN PATENT DOCUMENTS

| | | |
|---|---|---|
| EP | 1599012 A1 | 11/2005 |
| GB | 2405010 A | 2/2005 |
| WO | 1999/17852 A2 | 4/1999 |

OTHER PUBLICATIONS

Cronin, E., et al., "A Distributed Multiplayer Game Server System," UM EECS589 Course Project Report, May 4, 2001, pp. 1-42, XP002474301, University of Michigan, Ann Arbor, Michigan.

Morgan, Graham, et al., "Scalable Collision Detection for Massively Multiplayer Online Games," Advanced Information Networking and Applications, 2005, AINA 2005, 19th International Conference on Taipei, Taiwan, Mar. 25-30, 2005, Piscataway, New Jersey, USA, IEEE, Mar. 25, 2005, pp. 873-878, XP010789899.

Kacsuk, P., "Systematic macrostep debugging of message passing parallel programs," pp. 609-624, ISSN: 0167-739X, XP4197220, Elsevier Science B.V., Apr. 2000.

Skillicorn, David B., "Models and Lanugages for Parallel Computation," pp. 123-169, ISSN: 0360-0300, XP002454722, ACM Computing Surveys, vol. 30, No. 2, Jun. 1, 1998.

Malony, Allen D., "Automatic Scalability Analysis of Parallel Programs Based on Modeling Techniques," pp. 139-158, ISBN: 3-540-58021-2, XP009090717, PD 1994.

* cited by examiner

*Primary Examiner* — Ario Etienne
*Assistant Examiner* — Blake Rubin
(74) *Attorney, Agent, or Firm* — Marger Johnson & McCollom, P.C.

(57) ABSTRACT

A computer system is described in which the execution environment of the system is distributed between a server execution environment and a client execution environment of a client apparatus. Client components executed within the client execution environment are selected to be a primary client component in dependence on a property of an instance of program execution in the client execution environment.

24 Claims, 5 Drawing Sheets

SIMULATION TECHNIQUES IN A DISTRIBUTED COMPUTER SYSTEM

RELATED APPLICATION DATA

This application claims priority and benefit of GB0624297.8, filed 5 Dec. 2006, the entire contents of which are herein incorporated by reference. This application is also related to commonly-owned U.S. application Ser. No. 11/773,304, filed 3 Jul. 2007, which claimed priority from GB613275.7, filed 4 Jul. 2006, and its counterpart GB0712496.9, filed 27 Jun. 2007, the entire contents of which are herein incorporated by reference.

BACKGROUND AND SUMMARY OF THE INVENTION

The present invention relates to a computer system in which program execution is distributed across several machines. In particular, the present invention relates to a distributed computer system which utilises simulation information which influences the behaviour of program components being executed within the execution environment of the system.

It is known for a computer program to be divided up into a plurality of program components, e.g. program objects (for example in the context of object oriented software programming techniques) or computations, so that several components can be executed in parallel or so that one or more components can be executed in turn. A program component, such as a program object, can be considered to be a discrete item forming part of a computer program comprising data and procedures necessary to operate on that data.

Many techniques have been proposed which facilitate the interaction between multiple machines, at different locations, within the domain of a computer program via a network (e.g. a local area network (LAN) or the internet). In the context of computer games, for example, there is a desire for users to share a virtual world and to interact with each other, within that virtual world, in real-time.

Distributed or parallel execution of a computer program across several machines is problematic for a number of reasons. One of the main problems to be dealt with in implementing a distributed computer program is that, given the same user inputs, the execution of the same section of code on two different machines will tend to produce different results. This is primarily due to differences in the local hardware and software properties of those machines and also due to the machines executing sections of code at different speeds. Thus, distributed programming systems are often said to be non-deterministic, meaning that the outcome of executing the program cannot be predicted.

One of the main sources of non-determinacy within a distributed computer system arises as a result of locally derived input information. For example, many computer games utilise simulation information in the form of physics-based calculations in order to apply the laws of physics to program components populating the virtual environment and thereby improve the simulated realism of the game. Other types of simulation information may include information defining behaviour e.g. actions controlled by a script that is triggered at certain times or in certain circumstances or an algorithm generating behaviour on the fly. A third form of simulation information relates to user controlled behaviour e.g. the interactions of one or more user characters with the simulated world.

Physics simulation may result in a non-player character (NPC) standing around, held on the ground by gravity. Scripted or algorithmic behaviour can make the NPC character move e.g. by walking or turning. Physics simulation can then additionally be used to make realistic movements.

A third form of simulation information relates to user controlled behaviour e.g. the interactions of one or more user characters with the simulated world.

The required simulation information is typically derived using locally provided hardware components, or by software modules running on one or more processors installed on the local machine. For example, computer programs called "physics engines" are known which supply the computer game with values to define the movement and interactions of components within the virtual world. Similarly, hardware components, such as so-called physics accelerator cards, are also used in order to provide the data necessary to realistically simulate component motions in a way that models the laws of physics.

As a result of differing simulation systems generating simulation data to different levels of precision and with different rounding or floating point units, the use of simulation information during execution of a computer program will introduce the potential for a divergence between corresponding component states on different machines. Inconsistencies between the execution, and thus the simulation, of component interactions and behaviour between different machines comprised in a distributed system will quickly result in observably divergent behaviour. In some instances this divergence can even lead to different program results being obtained on different computers. Consider, for example, the case of a computer game which is operable to simulate an explosion within the virtual game world, wherein the explosion causes a plurality of the bricks to fly through the air colliding with each other and other components in the game. If different simulation information is used by different computers, it is possible for a character simulated on one computer to avoid being struck by one of the bricks and to live, but for the same character simulated on another computer to be struck by a brick and die.

To ensure that the behaviour, or execution, of an object (or any other computation) executed on one machine is the same as the behaviour of the corresponding object on another machine, it is necessary to ensure that the simulation information utilised during execution of the corresponding objects is derived from the same source.

In a computer system comprising a server and a plurality of clients, it is known for simulation information required by components executed within the system in a distributed fashion to be derived at a server, and for this information to be communicated to the client machines for their use in executing component execution. Alternatively, it is known for execution of a component to be conducted on the server and for details about the state of that component to be transmitted to the client.

However, these techniques utilise a significant amount of the bandwidth capacity available to the system to be taken up by transmissions operable to communicate the required simulation information to the various client components or the details of about the state of the corresponding component following execution on the server. Moreover, many computer systems support the execution of a large number of interacting components; these systems therefore require a substantial amount of simulation information to be derived in order that components behave in a realistic way. The quantity of information to be transmitted between machines via the network may be prohibitive, especially for global MMOGs (Massively Multiplayer Online Games). Indeed, as a result of bandwidth constraints, the implementation of distributed multiplayer games which use a high number of components requiring simulation information is often restricted to interaction over a local area network because they demand too much bandwidth resource to be properly implemented over the internet.

There is a therefore a need to reduce the bandwidth requirements of computer systems which comprise a distributed execution environment whilst alleviating the potential for divergence in the state of corresponding components being executed on different machines.

According to a first aspect of the present invention, there is provided a computer system comprising a program execution environment which is distributed between a server execution environment of a server apparatus and a client execution environment of a client apparatus, said client execution environment being operable to execute a plurality of client components, and said server execution environment being operable to execute a server component corresponding to each client component, wherein at least one client component is selected to be a primary client component, the or each primary client component being operable such that its execution, e.g. its behaviour and/or state, is influenced by simulation information which is derived from the same source as simulation information which is operable to influence the execution of the corresponding server component, and wherein a client component is selected to be a primary client component in dependence on a property of an instance of program execution in the client execution environment.

It should be appreciated that the behaviour of a component could be effected without a permanent change to the state of the component, i.e. it receives, uses and discards simulation information without altering its own state. Alternatively, the component could merely update its own state without visibly altering its external behaviour i.e. it could simply store details of simulation information for later potential use.

Preferably, the program execution environment comprises a deterministic execution environment.

According to one embodiment, simulation information derived for a server component that corresponds to a primary client component is communicated to both the primary client component and the corresponding server component, wherein said primary client component and said corresponding server component are operable, following receipt of said simulation information, to be executed using said simulation information. Thus, according to this embodiment, where a selected client component and corresponding server component require the input of simulation information in order to be executed to a future state, both components are operable to conduct the execution independently without introducing divergent behaviour as a result of using the simulation information.

Alternatively, simulation information derived for a server component that corresponds to a primary client component is communicated to the server component, said server component being operable, following receipt of said simulation information, to be executed using said simulation information to give an execution result, and wherein information relating to said execution result is communicated to the primary client component to which said server component corresponds.

A property of an instance of program execution in the client execution environment may be, for example, related to a measure of the "importance" of the simulation or execution of that component by the client machine. The level of importance of a component will generally be from the perspective of the program user, the player, or virtual player (character) as displayed on the display means of the client machine. In other words, how important the simulation of that component is to the realism, virtual properties, or outcome of running the program. Thus, according to embodiments of the present invention, the selection of primary client components is client dependent. For example, a primary client component may be selected in dependence upon a measure of the apparent distance to said component when simulated on said display means of said client. Thus, client components may be classified into foreground components and background components, wherein the execution environment is operable to allow the execution of the foreground components to behave in the same way as the corresponding server component. Thus, according to this embodiment, the behaviour of the foreground components and the corresponding components on the server is governed by simulation information that is derived from the same source.

Where a client component other than a selected client component requires simulation information in order to be executed to a future state, this information may be derived locally, for example by means of a simulation system such as a locally implemented physics engine or a locally implemented physics accelerator. Thus, the state of these components will be different to the state of the corresponding server components which will have been executed using simulation data generated by a simulation system of the server.

Regarding such physics engines and physics accelerators, it is envisaged that add-on hardware cards may be utilised in a widespread fashion for gaming which is demanding, both in graphics and computation. In the same way that existing hardware systems utilise powerful graphics processor units (GPUs) on graphics cards, it is envisaged that additional hardware may be employed to enable complex physics calculations to be taken away from the main motherboard processor.

Preferably, the server periodically transmits correction information for a destination client component that is not a primary client component. Preferably, the correction information comprises information about the state of the server component corresponding to said destination client component. Preferably, the server is operable to transmit correction information to the or each client comprised in the system. Following receipt of this correction information, a client apparatus is operable to change the state of one or more of its components which are not primary client components based on said correction information.

Thus, according to preferred embodiments of the present invention, the execution environment operates to ensure that a subset of client components will behave in the same way as the corresponding server component(s). This means that the state of the selected primary client component will be the same as the state of the corresponding server component at a given point in the execution of the component code.

This is achieved, according to embodiments of the present invention, by ensuring that the behaviour of corresponding components is influenced by simulation information that is derived from the same source.

According to a further aspect of the present invention, there is provided a server apparatus comprising a server execution environment, said server being for use in a computer system comprising a program execution environment which is distributed between said server execution environment and a client execution environment, wherein said server is operable to execute a server component corresponding to each component operable to be executed within said client execution environment,
and wherein said server is operable to communicate with a primary client component such that the behaviour and or state of said primary client component is influenced by simulation information which is derived from the same source as simulation information which influences the behaviour and or state of the server component corresponding to said primary client component, wherein said primary client component has been selected in dependence on a property of an instance of program execution in the client execution environment.

According to a still further aspect of the present invention there is provided a client apparatus comprising a client execution environment, said client being for use in a computer system comprising a program execution environment which is distributed between a server execution environment and said client execution environment, said client execution environment being operable to execute a plurality of client components, wherein at least one client component is selected to be a primary client component in dependence on a property of an instance of program execution in the client execution environment, the or each primary client component being operable to communicate with said server such that its behaviour and/or state is influenced by simulation information derived from the same source as simulation information which influences the behaviour and/or state of a server component operable to be executed by said server execution environment and corresponding to said primary client component.

According to embodiments of the present invention the client execution environment may execute one or more components for simulation on a display means thereof, or to generate an auditory effect. It will be appreciated that there may be components executing within the client execution environment which do not have a representation on a display, for example, if a single component is implemented as a collection of executing components.

Advantageously, embodiments of the present invention are capable of supporting the execution of large numbers of program components executing within a distributed execution environment, whilst permitting a reduction in the bandwidth requirements of the system and also improving overall system responsiveness. Essentially, embodiments of the present invention ensure that those components that are considered to be important from the perspective of each client comprised in the system, according to some defined heuristic or algorithm, are simulated to a high degree of accuracy with respect to the simulation results obtained on the server. Furthermore, embodiments of the present invention provide a way of handling divergent behaviour of the less important client components with efficient use of bandwidth capacity.

Embodiments of the present invention are particularly advantageous in that they facilitate an efficient use of the bandwidth capacity available to a distributed system whilst still enabling all components to be simulated within the virtual world with a high degree of realism.

In United Kingdom Patent Application No. 0712496.9 (hereinafter "GB 0712496.9"), and its counterpart U.S. application Ser. No. 11/773,304, the entire content of which is incorporated herein by way of reference thereto, a computer system is proposed comprising an execution environment which is structured to facilitate execution of code in "frames", or units of time, with at least one program component, e.g. program "object", comprised in each frame.

According to the rules of the system described in GB 0712496.9, components are allowed to communicate with components in another frame but communication is not possible between components in the same frame. For each frame, the system runs through all the components in the system and executes each one. Components may be executed out of order or in parallel. Each component has a state that includes a fixed amount of data for the component and an execution point. When a component is created, the execution point is at the start of the component's main procedure. When execution of the component's main procedure reaches a next-frame statement, then execution of that component stops for this frame. At the end of the frame, the new component state is stored. During execution of a component's code, messages may be created. These must be queued up and attached to a target component. Messages can only be read by the target component on the next frame. The messages may also need to be transmitted over a network. Also, a component might read in messages. The messages must be read in a deterministic order. This is to allow out-of order and parallel execution on multiple systems. The order can be defined by the system. At the end of the frame all unused messages can be discarded. All modified components are modified and the frame number is increased by 1. Execution can continue onto the next frame.

Before executing the code of a component it is necessary to know that (for this frame) all potential messages from any component in the system (i.e. across the entire network), or the state of other components that this component refers to must be available. If not, it might be desirable to execute speculatively. For example, the component and its frame number may be stored and then the execution can continue without all of the information required. The component may be marked as speculative so that it may be possible to revisit this component and re-execute it "correctly" once all of the required information has arrived.

FIG. 1 shows the execution of four objects, labelled a to d, according to the distributed computer system described in GB 0712496.9. The state in frame n is known and execution of frame n has produced a message from b to a. In frame n+1, object c reads data from objects b and d. In frame n+2, object a reads data from object c. From FIG. 1, it can be seen that there is no communication between objects in the same frame. Message dependencies only exist from one frame to the next, while read dependencies only exist from the current frame to the previous frame. This feature is what allows the system to be executed in parallel and over a network. The diagram shows a partial execution in which a is calculated up to frame n+1 and b is ignored. This is to illustrate that it is possible to execute beyond the current consistent network state to calculate a speculative state (which will be based on a mixture of real input data and guessed input data). However, if it is later discovered that b in frame n+1 sends a message to a then, the execution of a in frame n+1 is potentially false and may need to be re-calculated.

The code for each object for each frame can be considered as a function of the value of all the referenced objects in the previous frame and all the messages received by the object. Therefore, if the objects in frame n and the messages from frame n to frame n+1 are consistent throughout the system, then the state of all objects in frame n+1 and the messages from frame n+1 to frame n+2 are just a function of data that is consistent throughout the system. Therefore, the objects will stay consistent as long as the initial state and initial messages are consistent and the functions are executed consistently. In other words, the system is deterministic because all of its causes are known.

Thus, the computer system described in GB 0712496.9 may be advantageous in a distributed implementation since it facilitates the deterministic execution of a computer program ensuring that if the same component in the same state executes the same code on two different computers, or at two different times, then the new state of the component will be identical on both machines or at both times.

According to a preferred embodiment of the present invention, the execution of program components is conducted in accordance with the techniques described in GB 0613275.7, from which U.S. application Ser. No. 11/773,304 claims priority. Accordingly, a program execution environment is provided which is operable such that the execution of one or more components of a computer program is carried out in a plurality of sequential frames of execution, wherein the execution environment is further operable to:

i) allow communication between one said component and another said component in different frames of execution; and ii) to prevent communication between one said component and another said component in the same frame of execution The communication between components may include at least one of sending a message or reading at least a portion of the state of another component. The communication may take place between components of adjacent frames or between components of frames which are more than one frame apart. Preferably, the execution environment is operable to process messages in a pre-determined order. The component may consist of an object (i.e. a discrete item forming part of a computer program comprising data and procedures necessary to operate on that data).

An execution environment according to GB 0712496.9 is advantageously structured to facilitate execution of program code in "frames", i.e. or units of time or work, with at least one component of the program, comprised in each frame of execution. Moreover, if corresponding objects (i.e. —a discrete program component, for example implementing a character in a game, that is executed on two different machines) in the same state execute the same code on two different computers, or at two different times, then the new state of the object will advantageously be identical on both machines or at both times. Such an execution environment will be particularly advantageous in a distributed implementation since it facilitates the execution of a computer component in a distributed environment with a high degree of determinism. Dividing the program into sequential frames also advantageously allows different program components, or different objects, to be executed in parallel. Thus, the execution of multiple program portions may occur in parallel in any given frame.

According to the teaching described in GB 0712496.9, program components are executed in frames wherein a component in one frame is able to communicate with a component in a different, e.g. adjacent, frame but communication is not possible between components in the same frame. On the server, the server execution environment is operable to allow all communications to proceed between the server components. The server components are also operable to receive outside world messages and communication from a data generation unit. Thus, the state of any component to be executed on the server will be deterministic and will be a function of all communication to that component, including any simulation information that is communicated to the server object from a data generation unit. It is possible for simulation information to be communicated to a component by way of messages sent to the component, or by a component reading data from a data generation unit.

On the client, however, since non-primary client components will be receiving simulation information from a source different to that of the corresponding server component, it is undesirable to allow non-primary client components to communicate with primary client components since this will introduce the potential for a divergence in the state of a primary client component and its corresponding server component.

According to a particularly preferred embodiment of the present invention, the computer system is operable to ensure that the behaviour of a primary client component will tend to duplicate the behaviour of the corresponding server component. Preferably, the client component will behave in exactly the same way as the corresponding server component. Effectively, this means that the primary client components become a "subset" of the corresponding server client set, in that the execution of the subset mirrors the execution of the corresponding server set.

This is achieved, according to one embodiment, by the system being operable to ensure that any communications to a server component corresponding to a primary client component are also communicated to the primary client component. Thus, if information is to be communicated to a primary client component from a non-primary client component, the execution environment is operable to allow this communication to take place from the server component corresponding to the non-primary client component. Similarly, if a primary client component needs to read information from a non-primary client component, the execution is operable to allow this to be from the server component corresponding to the non-primary client component.

Advantageously, in accordance with this embodiment, the execution of primary client components is also deterministic and will be "correct" in the sense that that it will duplicate the execution of the corresponding server components and will be influenced by simulation information that as been derived from one source.

Alternatively, according to an embodiment of the present invention, the behaviour of a primary client component will be made to duplicate the behaviour of the corresponding server component by performing execution of the corresponding server component code and then transmitting details of the execution result to the primary client component.

The most appropriate mechanism for facilitating the duplication of server component states to a corresponding primary client component is chosen having regard to the quantity of information to be transmitted via the network. Thus, in some circumstances, it may be more efficient (in terms of bandwidth capacity) to send communications to the primary client component in order that the primary client components are operable to execute independently, but in a deterministic fashion. In other circumstances, it will be more efficient to transmit details of the result of execution performed on the server.

The system may be provided with another type of component, namely a "simulation component", e.g. a "simulation object" which may, for example, be a "physics object". This is useful if, for example, a non-deterministic simulation system is being used i.e. a simulation system whose output data has the potential to give non-deterministic results whose accuracy is adversely affected by external factors such as timing and order of execution. The simulation component is operable to receive simulation information from a simulation data generation unit and to derive component specific simulation information for affected components.

A simulation component, which may be provided within the server execution environment and/or the client execution environment, is operable to calculate any simulation data needed by various affected program components and to communicate this information to those components. Thus, according to embodiments of the present invention, the simulation component on the server is operable to communicate simulation information to the primary client components whilst the simulation component on the client will control non-primary client components.

Within the context of the present invention, the simulation component (which might be implemented as part of a C++ system, rather than within the rules of an execution environment which is operating in frames, as described above), behaves differently depending on whether the current frame is being executed speculatively (i.e. ahead of the server) or consistently (i.e. in-step with the server).

When the client execution environment is operating speculatively, the client's simulation component may be used to control both primary and non-primary components. These components can later be corrected by means of correction data sent from the server.

In any of the above aspects or embodiments, the various features may be implemented in hardware, or as software modules running on one or more processors. Features of one aspect or embodiment may be applied to any of the other aspects or embodiments.

The invention also provides a computer program or a computer program product for implementing the techniques described herein, and a computer readable storage medium having stored thereon a program for implementing the techniques described herein. A computer program embodying the present invention may be stored on a computer-readable medium, or it could, for example, be in the form of signal such as a downloadable data signal provide from an internet website, or it could be in any other form.

For a better understanding of the present invention, and to show how the same may be carried into effect, reference will now be made, by way of example, to the accompanying drawings in which:

DETAILED DESCRIPTION

Figure 1:
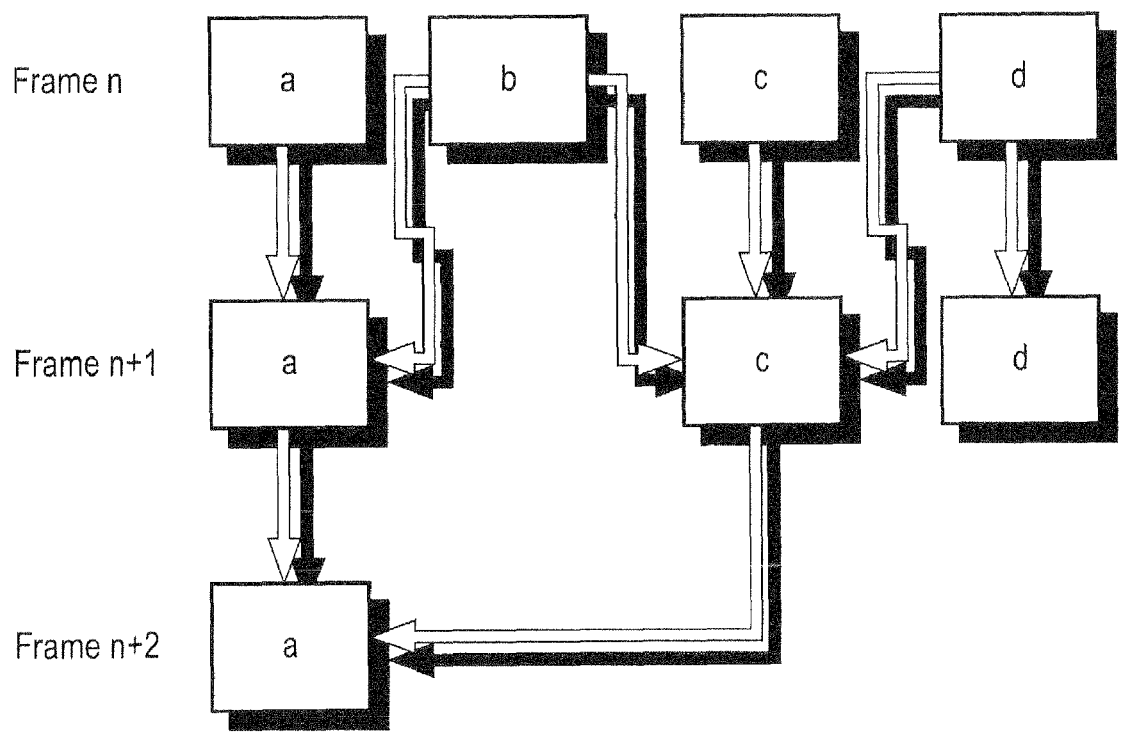
FIG. 1 illustrates an example of a deterministic execution environment.
Figure 2:
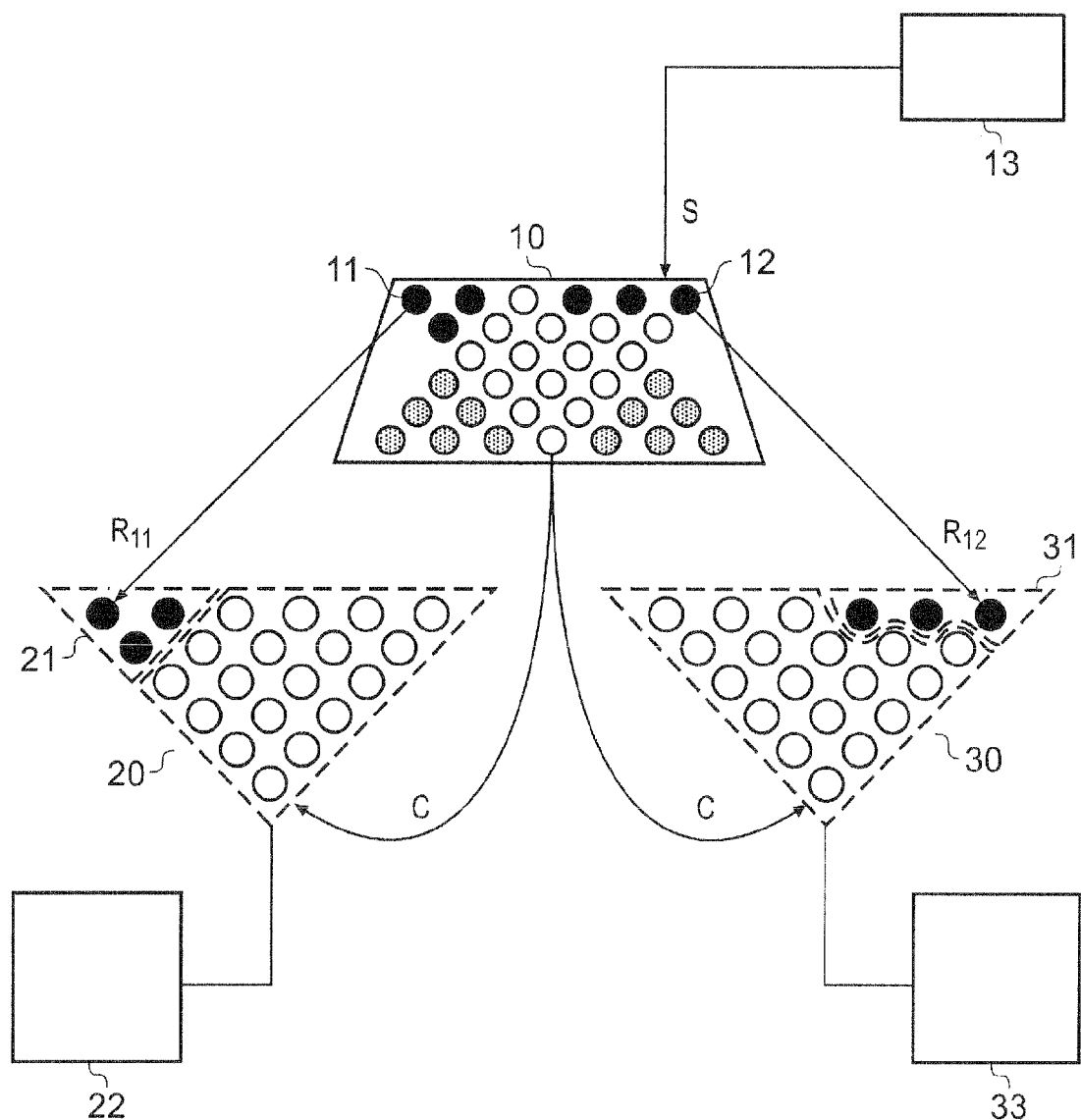
FIG. 2 illustrates an execution environment of a distributed computer system according to a first embodiment of the present invention.

Referring to FIG. 2, which illustrates a computer system embodying the present invention comprising a server execution environment 10, a first client execution environment 20 and a second client execution environment 30. The system is operable to facilitate distributed execution of a computer program between the server execution environment and each of the first and second client execution environments.

Each client execution environment is executing twenty one program objects. The server execution environment is executing a total of thirty three objects, twenty one of which correspond to an object being executed on each of the clients. The remaining twelve objects correspond to objects which are not part of the virtual world being simulated on the client machine and are therefore not yet executing on the client execution environment. These objects may, however, generate communications for server objects which correspond to a client object.

Three of the objects being executed within client execution environment 20 have been classified as primary client objects 21 in dependence on a execution or simulation property of the first client execution environment 20. Three server objects 11 correspond to the three primary client objects 21 of the first client execution environment. Furthermore three of the objects being executed within client execution environment 30 have been classified as primary client objects 31 in dependence on a property of the second client execution environment 30. Three server objects 12 correspond to the three primary client objects 31 of the second client execution environment.

The computer program being executed by the computer system requires data comprising simulation information to be supplied to the objects. The simulation information serves to influence the behaviour or state of the objects and is used during the execution of a fragment of object code. Thus, the simulation information will influence the resultant state of an object. For example, the simulation information may comprise physics data which defines the movement of the objects within the virtual world in order that the objects move in a way that mimics the laws of physics. In this respect the server is provided with a data generation unit 13 which generates data, or simulation information S, for input to the server execution environment 10. The computer system further comprises data generation units 22 and 33 which are operable to generate data, or simulation information, for input to the first and second client execution environments 20 and 30 respectively.

In accordance with the present invention, primary client objects 21 of the first client execution environment and primary client objects 31 of the second client execution environment, are operable such that their behaviour is influenced by simulation information S which is derived by data generation unit 13. Thus, primary client objects 21 and 31 do not utilise simulation information that is derived locally by data generation unit 22 and 33 respectively. According to this embodiment, the data provided by the data generation unit 13 is used by each of the server objects 11 and 12 during a particular execution procedure in order to give an execution result for each object. The server then transmits details $R_{11}$ about the resultant states of the server objects 11 to the primary client objects 21, and details $R_{12}$ about the resultant states of the server objects 12 to the primary client objects 31. Upon receipt of these details, the primary client objects are operable to change their state accordingly.

Meanwhile, simulation information that is required by client objects which are not primary client objects is derived respectively by data generation unit 22 or 33. Thus, these non-primary client objects will be utilising simulation data which is likely to differ from the simulation data derived for the corresponding server object. As a result, the execution result obtained by a client object that is not a primary client object will be different to the execution result obtained by the corresponding server object. As an execution procedure progresses, execution results, or states, of corresponding objects will tend to diverge. Periodically, the server is operable to transmit correction information C to the client which provides details of the state of the server objects corresponding to non-primary client objects. This correction information C is transmitted less frequently than any communications intended for the primary object set and, preferably, only when there is spare bandwidth available in the network to accommodate the correction information C.

Figure 3:
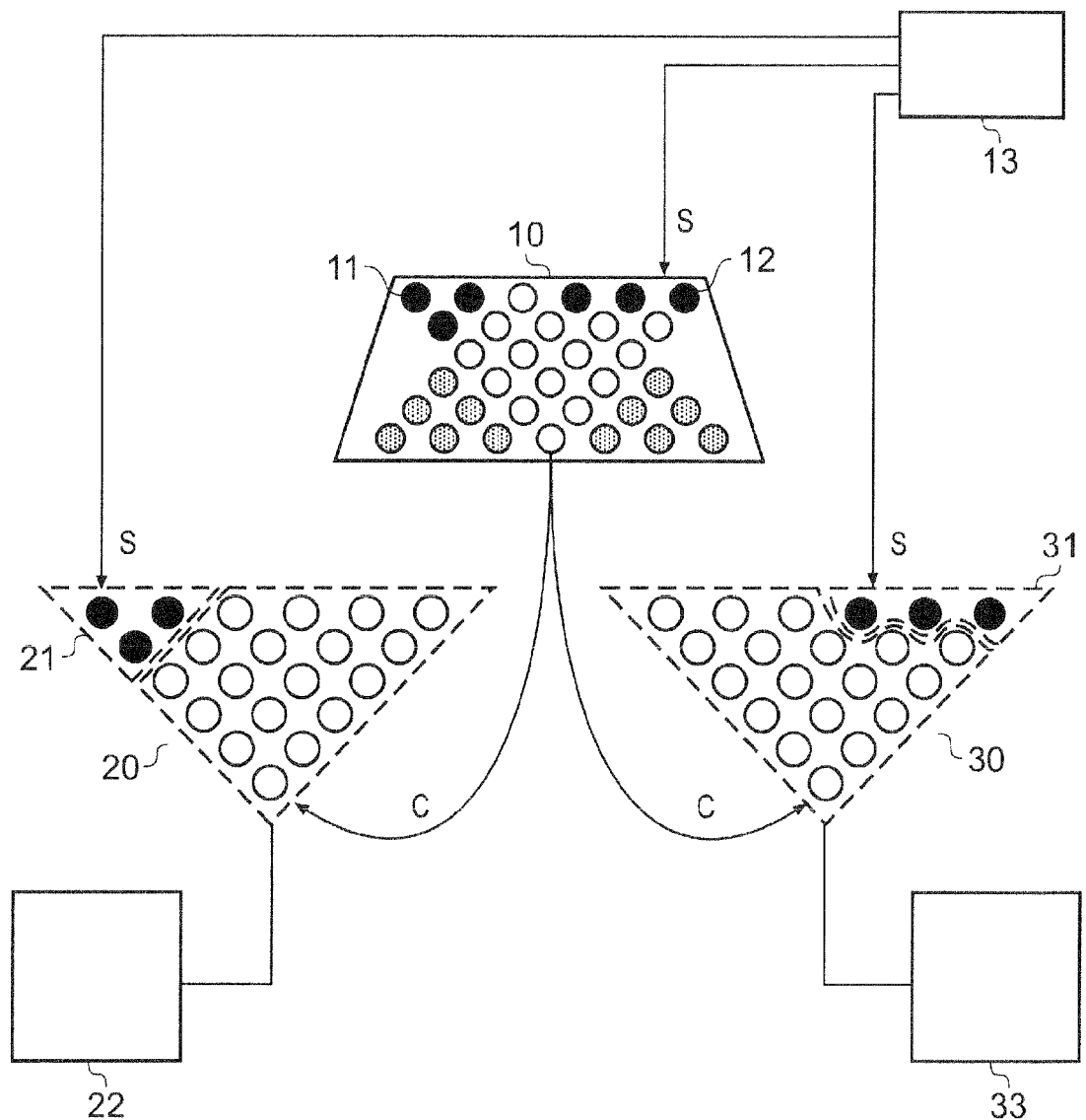
FIG. 3 illustrates an execution environment of a computer system according to a second embodiment of the present invention.

FIG. 3 illustrates a distributed execution environment embodying the present invention which is similar to the distributed execution environment illustrated in FIG. 2 except that simulation data S, generated by the data generation unit 13 associated with the server, is transmitted to both the server execution environment and each of the client execution environments. Specifically, according to this embodiment, the primary client objects receive the simulation data S and use this data to execute primary object code in order to derive an execution result. Thus, according to this embodiment, the primary client objects and the corresponding server objects are each performing object executions independently. However, since the object executions will be performed using the same simulation information, there will be very little divergence between the execution results obtained by corresponding objects.

In FIGS. 2 and 3, the program objects may advantageously be executed in frames wherein an object in one frame is able to communicate with an object in an adjacent frame but communication is not possible between objects in the same frame.

Thus, on the server, the server execution environment 10 is operable to allow all communications to proceed between the server objects. The server objects are also operable to receive outside world messages and communication from a data generation unit 13. Thus, the state of any object to be executed on the server will be deterministic and will be a function of all communication to that object, including any simulation information that is communicated to the server object from the data generation unit 13.

On each of the clients, since non-primary client objects will be receiving simulation information from their own data generation unit, the system is operable to prevent non-primary client objects from communicating with primary client objects since otherwise this would introduce the potential for a divergence in the state of a primary client object and its corresponding server object.

Thus, the behaviour of a primary client object will duplicate the behaviour of the corresponding server object. Effectively, this means that the primary client objects become a "subset" of the corresponding server client set, in that the execution of the subset mirrors the execution of the corresponding server set.

This is achieved, according to the embodiment shown in FIG. 2, by the system being operable to ensure that any communications to a server object corresponding to a primary client object are also communicated to the primary client object. Thus, if information is to be communicated to a primary client object from a non-primary client object, the execution environment is operable to allow this communication to take place from the server object corresponding to the non-primary client object. Similarly, if a primary client object needs to read information from a non-primary client object, the execution is operable to allow this to be from the server object corresponding to the non-primary client object.

Figure 4:
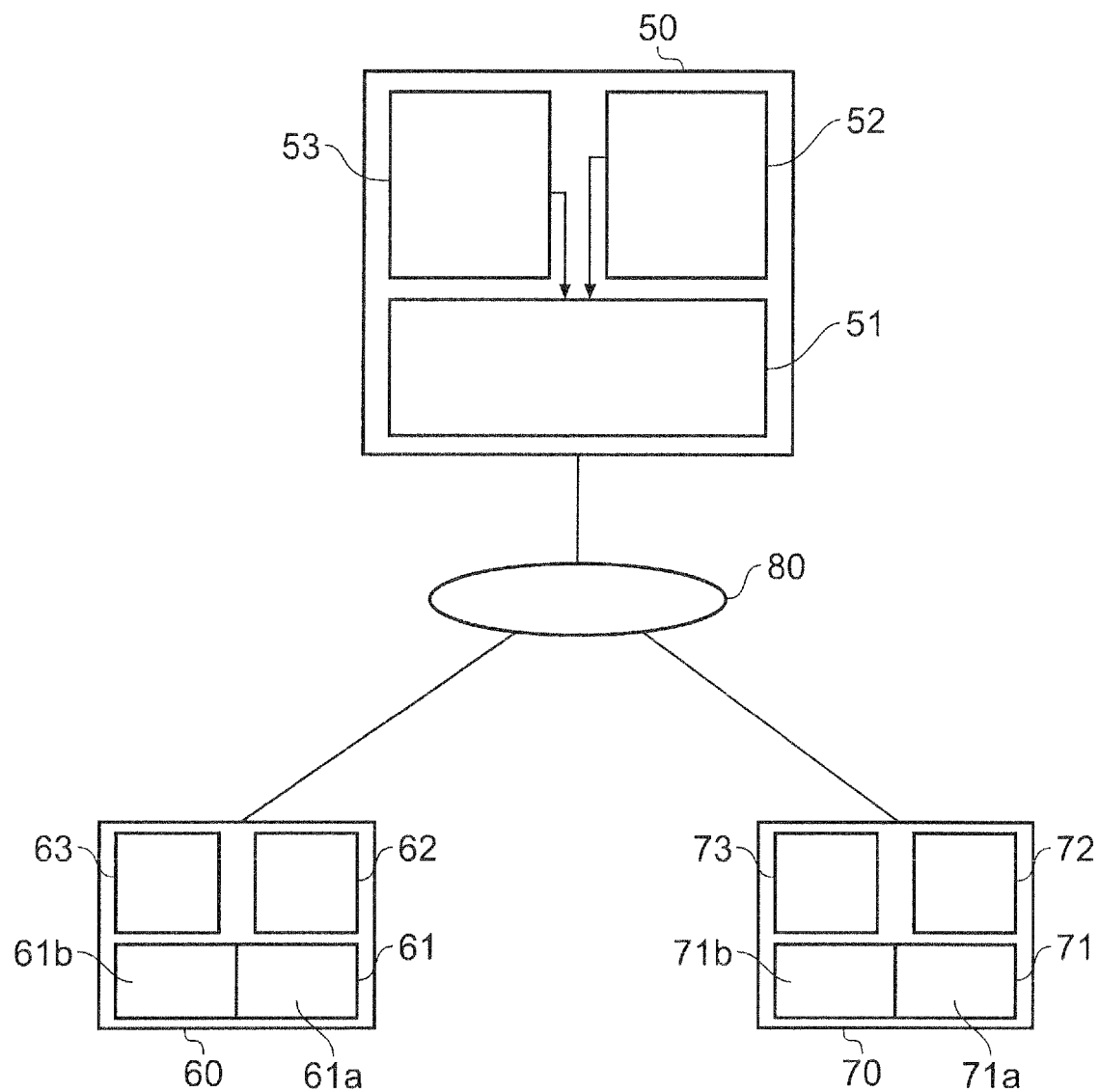
FIG. 4 shows parts of distributed computer system according to an embodiment of the present invention.

FIG. 4 illustrates parts of a distributed computer system according to an embodiment of the present invention comprising a server apparatus 50, a first client apparatus 60 and a second client apparatus 70. The server and first and second client apparatuses are each operable to communicate with each other via a network 80.

The server apparatus comprises a server execution environment 51, a data generation unit 52 and an object classification derivation unit 53. In use, the server execution environment is operable to execute a plurality of program objects or computations. The data generation unit 52 comprises a physics engine comprising a computer program operable to run on a processor of the server apparatus to generate simulation data which can be used during the execution of a server object in order to define the movement and interactions of that object when simulated within a virtual world.

The object classification derivation unit 53 serves to classify objects that are being executed on a client execution environment as primary objects or non-primary objects. Furthermore, the classification unit is operable to change the classification of an object as the program execution progresses. In this way, a non-primary client object that becomes more important to the simulation of the computer program on a display means of one of the client machines may be promoted to become a primary object by the classification derivation unit 53. The object classification derivation unit is able to classify a client object on the basis of information about the importance of execution or simulation by the client that is available to it from the server execution environment which executes objects corresponding to the client objects. A calculation means of the classification derivation unit, or means operable to communicate with the classification derivation unit, performs a calculation to determine the relative importance of client objects, at an instance of client object execution, based on some criteria relating to the virtual world being represented by the client machine. This calculation is performed periodically, preferably when objects are in a stable state (e.g. not in the middle of executing a frame), and the results are stored and used to alter the behaviour of the server execution environment and the client execution environment. For example, the calculation may be performed at every frame or at intervals of N frames.

Each of the client apparatuses 60 or 70 respectively comprise an execution environment, 61 or 71, a data generation unit 62 or 72, and an object classification receiving unit 63 or 73.

In use, each client execution environment is operable to execute a plurality of program objects or computations. Each data generation unit comprises a simulation system, such as a physics engine, operable in use to generate simulation data which can be used during the execution of a server object in order to define the movement and interactions of that object when simulated on a display means of the client apparatus.

Each object classification is operable to receive information, from the object classification derivation unit 53 via the network 80, which informs the client which objects being executed within the client execution environment are primary and non-primary objects. Based on this information, the system is operable to ensure that the behaviour of a primary client object is governed by simulation data that is generated by the data generation unit 52 associated with the server. According to one possibility, the system is operable to transmit simulation information generated for a server object which corresponds to a primary client object to part 61*b* or 71*b* of the client execution environment 61 or 71 respectively. Furthermore, any simulation data that is required by non-primary client objects is derived by the local simulation system, 61*a* or 71*a*, of the respective client apparatus.

In accordance with a particularly preferred embodiment of the present invention, the execution environment 51, 61 and 71 comprises an execution environment according to the teachings of GB 0712496.9. Such an execution environment, which may be implemented as a virtual machine, allows execution to be conducted in accordance with the framing technique previously described. The execution environment maintains a set of frames. Each frame has a number. Within each frame are objects and messages. Messages are attached to two frames. They are sent from one frame and are received in the next. The virtual machine preferably needs to have a system for storing frames, objects and messages. There should be at least one frame stored—the current consistent frame. During the execution of a frame, then there will be at least two frames in the store—the current and next frame. Objects are read from the current frame, executed and then written to the next frame.

In accordance with this preferred embodiment, a message sent from frame n will typically arrive in frame n+1. Therefore, separate queues should preferably be maintained for each object in each frame. To maintain consistent execution, the messages are sorted using a predefined sorting specification. It does not matter what the sorting specification is, as long as it is consistent throughout the network and results in an ordering of messages such that the determinism of the program is not compromised. Thus, if there are two messages A and B that are completely identical, the relative order of A and B is immaterial. If A and B can be in any way distinguished, the order is then (potentially) significant. Messages will be sent into the system attached to frame numbers. The system therefore stores these messages in the correct place.

There should also preferably be a system of identifying objects, such that given an object and a frame number, the execution environment can find the object within its store or in another location on the network. If the object is not within the store, but is available somewhere else on the network, the execution environment is operable to send a request for the object state over the network. The execution environment on the other system will be operable to receive the request and to send back the object state over the network.

Furthermore, the system is preferably adapted to destroy frames, objects and messages that are no longer in use. Generally, frames, objects and messages that are older than the consistent execution frame are no longer required. The system is also adapted to maintain sets of objects and to quickly determine which objects are inside the set, and which objects are outside. This is used for speculative execution and networking.

The system is also preferably provided with a mechanism which allows it to know when all object states and messages are available for a frame. If messages are being sent from another computer on the network, the system is capable of identifying when all messages have arrived. Consistent execution for a frame should preferably not start until all messages are available. The system also may need to be able to maintain one or more speculative execution frames. This is another frame that is ahead of the consistent execution frame. The speculative execution frame is produced by executing from the consistent execution frame to the speculative execution frame and ignoring any missing objects or messages that are not available. The system is operable to keep all messages used up by this execution in their original frames. When an object destroys itself, all references to that object are changed to a state that clearly defines a dead reference. This may be done when the object destroys itself or at the time of use. The system is operable to prevent the destruction of objects that have no references to them. Such objects might still be active in the system.

The network transport system is operable to serialize objects and messages to a network packet. It is also able to receive objects and messages attached to individual frames and put them into the local store. It also implements a system of specifying sets of objects that are to be duplicated on other machines on the network. The sets and the machines they are duplicated across are stored in a list. It is then possible to find all messages that cross over the set boundaries and send these to the machines that need them. Messages that come from objects on the local machine into a set of objects that are duplicated onto other machines on the network, are operable to be sent to the relevant machines. Once all messages from the local machine have been sent to objects for the current frame, a message is sent to other machines to say they have received all messages from this system for this frame. This allows those other machines to stop waiting for messages for the current frame. Messages from the local system into the network programming system are assumed to be sent at the current speculative frame, not the current consistent network frame. i.e. messages sent from the user will only be allowed to be applied to the speculative state and queued until the consistent network state consumes them.

To deal with the situation of a machine on the network losing its connection, a time-out is enforced by the system, so that if a machine has not sent in a complete frame's worth of messages, then it is assumed by other machines that no messages will be sent for that frame from that machine. The machine will have to be sent a message saying that it must also assume that none of its messages for that frame will be allowed into the consistent network state. Sometimes it will be necessary to send the states of objects across the network repeatedly for every frame, so that other objects on the target computer can read the states of those objects, without having to execute those objects. This is because there may not be a boundary across which only messages are sent. There may be a continuous sequence of objects that read the state of their neighbours. The neighbouring objects must therefore be repeatedly sent over the network, so that their states can be read by objects that are being read by the machines.

Figure 5:
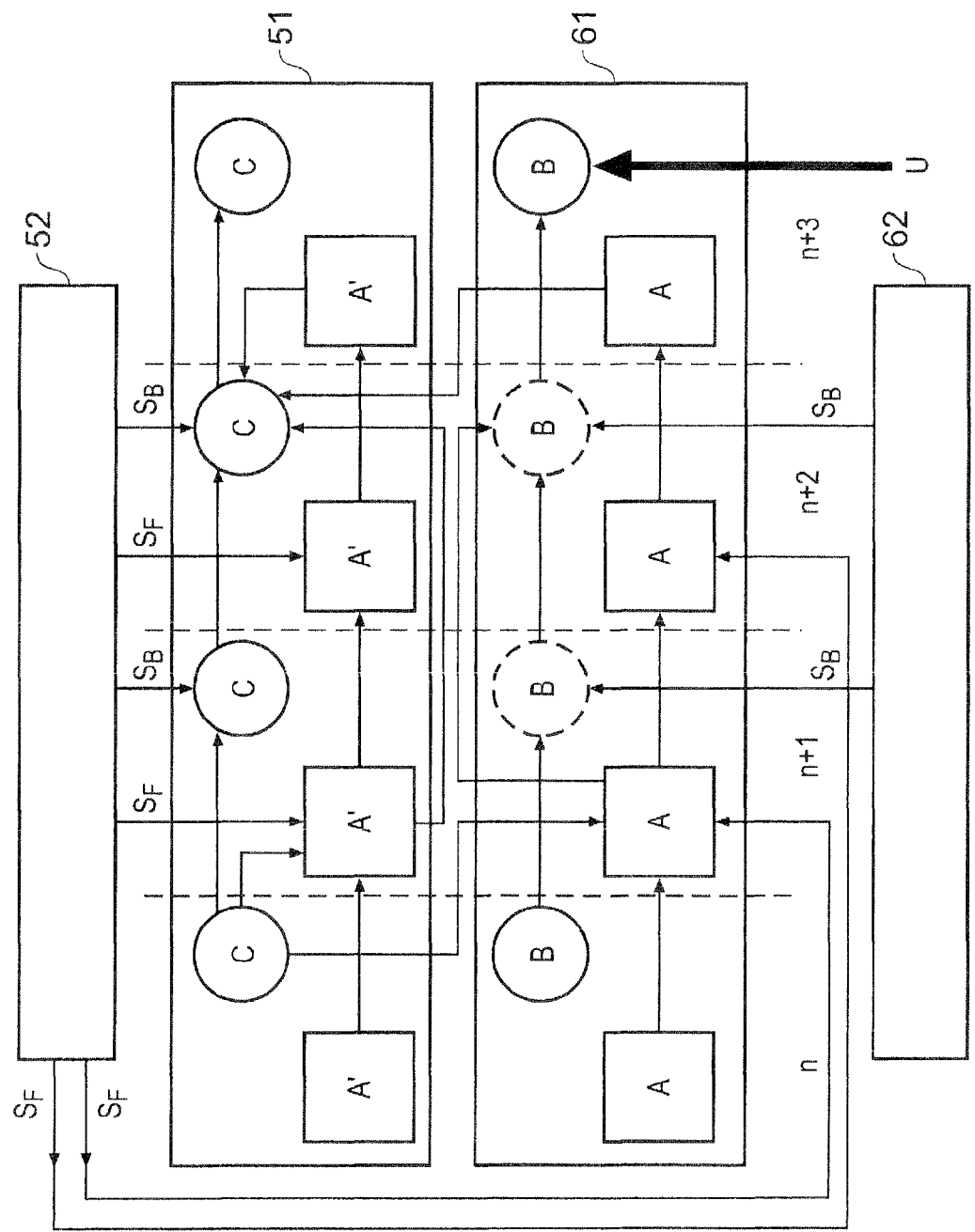
FIG. 5 illustrates possible communications between components according to a particularly preferred embodiment in which components are executed in frames.

FIG. 5 shows a schematic diagram to illustrate the execution of a primary client object A and a non-primary client object B, as well as the execution of a server object A' corresponding to the primary client object A and a server object C corresponding to the non-primary object B. In particular, according to this embodiment, the execution of the client objects and the server objects is divided into a series of frames, or units of time. Thus, FIG. 5 shows the state of the objects at time n, n+1, n+2 and n+3.

In particular FIG. 5 shows possible communications between objects according to a particularly preferred embodiment in which objects are executed in frames and wherein, according to the rules of the execution environment, an object in one frame is able to communicate with an object in an adjacent frame but communication is not possible between objects in the same frame.

In frame n, server object C, which corresponds to a non-primary client object B, is operable to transmit a message to server object A' corresponding to a primary client object A. Furthermore, in order to ensure that the state of the corresponding primary client object does not diverge, this message is also transmitted to primary client object A.

In frame n+1 and N+2, object A' and object C each receive simulation information S from data generation unit 52. Furthermore, the simulation information is sent to object A via the network for its use during execution in frames n+1 and n+2. Simulation information Sb required by the non-primary client object B is supplied from its local simulation system 62. Thus, at frame n=1, the state of object B starts to diverge from the state of object C.

In frame n+3, server object A' is operable to read information from server object C. Furthermore, in order to ensure that the state of the corresponding primary client object does not diverge, primary client object A is operable to read information from server object C, rather than from the corresponding non-primary client object B. Also in frame n+3, non-primary client object B is operable to receive correction information B from the server which provides details of the state of object C.

Following receipt of this information, the state of object B is updated to match the state of object C.

Thus, according to this embodiment, the following communications are operable to be sent from the server to primary client objects A via the network:
i) messages from "invisible" objects executing on the server which are not executing on the client;
ii) communications from server objects C corresponding to non-primary client object;
iii) communications from simulation system 52; and
iv) message from the outside world.

All other communications for client objects are not sent. Thus, non-primary client objects are executing speculatively but will be corrected periodically by correction information U.

Having illustrated and described the invention in several embodiments and examples, it should be apparent that the invention can be modified, embodied, elaborated or applied in various ways without departing from the principles of the invention. The invention can be implemented in software programs and data structures stored on portable storage media, transmitted by digital communications, or other transmission medium, or stored in a computer memory. Such programs and data structures can be executed on a computer, to perform methods embodying the invention, and to operate as a machine, or part of apparatus, having the capabilities described herein.

The invention claimed is:

1. A computer system comprising a program execution environment which is distributed between a server execution environment of a server apparatus and a client execution environment of a client apparatus,
   said client execution environment being operable to execute a plurality of client components,
   and said server execution environment being operable to execute a server component corresponding to each client component,
   wherein at least one client component is selected to be a primary client component, each primary client component being operable such that its behaviour and/or state is influenced by simulation information which is derived from the same source as simulation information which is operable to influence the behaviour and/or state of the corresponding server component,
   wherein at least one client component is selected to be a non-primary client component, the non-primary client component being operable such that its behaviour and/or state is influenced by simulation information which is derived locally, such that the locally derived simulation information is different from simulation information which is operable to influence the behaviour and/or state of the corresponding server component,
   wherein a client component is selected to be a primary client component or a non-primary client component in dependence on a property of an instance of program execution in the client execution environment,
   wherein the primary client component receives simulation information from a first source and each non-primary component receives simulation information from a second source, the second source being different from the first source; and
   wherein the server is operable to transmit correction information to said client and wherein said client is operable, following receipt of said correction information, to change the state of one or more non-primary client components only based on said correction information.

2. A computer system as claimed in claim 1, wherein said simulation information is derived in a data generation unit associated with the server.

3. A computer system as claimed in claim 2, wherein simulation information derived for a server component that corresponds to a primary client component is communicated to both the primary client component and the corresponding server component, wherein said primary client component and said corresponding server component are operable, following receipt of said simulation information, to be executed using said simulation information.

4. A computer system as claimed in claim 2, wherein simulation information derived for a server component that corresponds to a primary client component is communicated to the server component, said server component being operable, following receipt of said simulation information, to be executed using said simulation information to give an execution result, and wherein information relating to said execution result is communicated to the primary client component to which said server component corresponds.

5. A computer system as claimed in claim 1, wherein each primary client component is selected in dependence upon a measure of the importance of the simulation of that component on a display means of said client.

6. A computer system as claimed in claim 1, wherein each primary client component is selected in dependence upon a measure of the apparent distance to said component when simulated on a display means of said client.

7. A computer system as claimed in claim 1, wherein the client comprises a data generation unit which derives simulation information for use by client components which are not primary client components.

8. A computer system as claimed in claim 1, wherein the execution environment is operable such that the execution of each of said client components and said server components is carried out in a plurality of sequential frames of execution, wherein the execution environment is further operable to:
   i) allow communication between one said component and another said component in different frames of execution; and
   ii) prevent communication between one said component and another said component in the same frame of execution.

9. A computer system as claimed in claim 8, wherein the execution environment is operable to prevent communication between a primary client component and a client component which is not a primary client component.

10. A computer system as claimed in claim 8, wherein communication between components may be achieved by a component sending a message to a component of a subsequent frame, or by a component reading a component of a previous frame.

11. A computer system as claimed in claim 9, wherein a server component other than a server component corresponding to a primary client component is operable to send a message to one said primary client component of a subsequent frame.

12. A computer system as claimed in claim 9, wherein a primary client component is operable to read information from a server component of a previous frame other than a server component corresponding to a primary client component.

13. A computer system as claimed in claim 1, further comprising a simulation component, wherein said simulation component is operable to receive said simulation information and to derive component specific simulation information for said server components and said primary client components.

14. A server apparatus comprising a server execution environment, said server being for use in a computer system comprising a program execution environment which is distributed between said server execution environment and a client execution environment,
- wherein said server is operable to execute a server component corresponding to each component operable to be executed within said client execution environment,
- wherein said server is operable to communicate with a primary client component such that the behaviour and/or state of said primary client component is influenced by simulation information which is derived from the same source as simulation information which influences the behaviour and/or state of the server component corresponding to said primary client component,
- wherein said server is operable to communicate with a non-primary client component such that the behaviour and/or state of said non-primary client component is influenced by simulation information which is derived locally, such that the locally derived simulation information is different from simulation information which influences the behaviour and/or state of the server component corresponding to said non-primary client component, wherein said primary client component and said non-primary client component have been selected in dependence on a property of an instance of program execution in the client execution environment,
- wherein the primary client component receives simulation information from a first source and each non-primary component receives simulation information from a second source, the second source being different from the first source; and
- wherein the server is operable to transmit correction information to said client and wherein said client is operable, following receipt of said correction information, to change the state of one or more non-primary client components only based on said correction information.

15. A server apparatus as claimed in claim 14, further comprising a data generation unit operable to derive said simulation information.

16. A client apparatus comprising a client execution environment, said client being for use in a computer system comprising a program execution environment which is distributed between a server execution environment and said client execution environment,
- said client execution environment being operable to execute a plurality of client components for simulation on a display means thereof,
- wherein at least one client component is selected to be a primary client component in dependence on a property of an instance of program execution in the client execution environment, the primary client component being operable to communicate with said server such that its behaviour and/or state is influenced by simulation information derived from the same source as simulation information which influences the behaviour and/or state of a server component operable to be executed by said server execution environment and corresponding to said primary client component,
- wherein at least one client component is selected to be a non-primary client component in dependence on a property of an instance of program execution in the client execution environment, the non-primary client component being operable to communicate with said server such that its behaviour and/or state is influenced by simulation information derived locally, such that the locally derived simulation information is different from the simulation information which influences the behaviour and/or state of a server component operable to be executed by said server execution environment and corresponding to said non-primary client component,
- wherein the primary client component receives simulation information from a first source and each non-primary component receives simulation information from a second source, the second source being different from the first source; and
- wherein the server is operable to transmit correction information to said client and wherein said client is operable, following receipt of said correction information, to change the state of one or more non-primary client components only based on said correction information.

17. A client apparatus as claimed in claim 16, further comprising a data generation unit operable to derive simulation information for use by client components which are not said primary client components.

18. A method of executing a program in which execution of program components is distributed between a server execution environment and a client execution environment, the method comprising:
- executing, at the client, a plurality of client components for simulation on a display means thereof;
- executing, at the server, a plurality of server components corresponding to each client component;
- communicating information to a primary client component such that the primary client is operable such that its behaviour and/or state is influenced by simulation information which is derived from the same source as simulation information which is operable to influence the behaviour and/or state of the corresponding server component, and
- communicating information to a non-primary client component such that the non-primary client is operable such that its behaviour and/or state is influenced by simulation information which is derived locally, such that the locally derived simulation information is different from the simulation information which is operable to influence the behaviour and/or state of the corresponding server component,
- wherein a client component is selected to be a primary client component or a non-primary client component in dependence on a property of an instance of program execution in the client execution environment,
- wherein the primary client component receives simulation information from a first source and each non-primary component receives simulation information from a second source, the second source being different from the first source; and
- wherein the server is operable to transmit correction information to said client and wherein said client is operable, following receipt of said correction information, to change the state of one or more non-primary client components only based on said correction information.

19. A computer-readable storage medium having stored thereon a computer program which, when loaded onto a computer, causes the computer to become the server apparatus as claimed in claim 14.

20. A computer-readable storage medium having stored thereon a computer program which, when loaded onto a computer, causes the computer to become the client apparatus as claimed in claim 16.

21. A computer system as claimed in claim 1, wherein the correction information is transmitted periodically only when there is spare bandwidth available in the computer system.

22. A server apparatus as claimed in claim 14, wherein the correction information is transmitted periodically only when there is spare bandwidth available in the computer system.

23. A computer system as claimed in claim 16, wherein the correction information is transmitted periodically only when there is spare bandwidth available in the computer system.

24. A method as claimed in claim 18, wherein the correction information is transmitted periodically only when there is spare bandwidth available in the computer system.

* * * * *